US011711152B2

United States Patent
Jing et al.

(10) Patent No.: US 11,711,152 B2
(45) Date of Patent: Jul. 25, 2023

(54) RECEIVER, OPTICAL LINE TERMINAL, AND PASSIVE OPTICAL NETWORK SYSTEM

(71) Applicant: HUAWEI TECHNOLOGIES CO., LTD., Guangdong (CN)

(72) Inventors: Lei Jing, Wuhan (CN); Junye Jin, Dongguan (CN); Tianhai Chang, Dongguan (CN); Shengping Li, Wuhan (CN); Yuanbing Cheng, Wuhan (CN); Huafeng Lin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/722,907

(22) Filed: Apr. 18, 2022

(65) Prior Publication Data
US 2022/0239381 A1 Jul. 28, 2022

Related U.S. Application Data

(63) Continuation of application No. PCT/CN2020/112052, filed on Aug. 28, 2020.

(30) Foreign Application Priority Data

Nov. 12, 2019 (CN) .......................... 201911101778.0

(51) Int. Cl.
H04B 10/00 (2013.01)
H04B 10/67 (2013.01)
H04J 14/00 (2006.01)

(52) U.S. Cl.
CPC .................................. *H04B 10/672* (2013.01)

(58) Field of Classification Search
CPC .... H04B 10/69; H04B 10/691; H04B 10/693; H04B 10/6931
See application file for complete search history.

(56) References Cited

U.S. PATENT DOCUMENTS 10,644,652 B2 * 5/2020 Vera Villarroel ...... H04B 10/66
2013/0108278 A1 5/2013 Azadeh et al.
(Continued)

FOREIGN PATENT DOCUMENTS

CN 1333635 A 1/2002
CN 101103538 A 1/2008
(Continued)

OTHER PUBLICATIONS

Extended European Search Report in European Appln No. 20888581.4, dated Nov. 11, 2022, 10 pages.
(Continued)

*Primary Examiner* — Daniel G Dobson
(74) *Attorney, Agent, or Firm* — Fish & Richardson P.C.

(57) ABSTRACT

Example optical devices are described. One example optical device includes a receiver. The receiver includes a photodetector, a first amplifier, a second amplifier, and a controller, where the photodetector is coupled to the first amplifier, the first amplifier is coupled to the second amplifier, and the first amplifier and the second amplifier are separately coupled to the controller. The controller is configured to control a gain of the first amplifier and a gain of the second amplifier based on a preset arrival time of an optical signal and a gain intensity corresponding to the optical signal. The photodetector is configured to receive the optical signal and convert the optical signal into a current signal. The first amplifier is configured to convert the current signal into a first voltage signal. The second amplifier is configured to convert the first voltage signal into a second voltage signal.

20 Claims, 5 Drawing Sheets

(56) References Cited

U.S. PATENT DOCUMENTS

| | | |
|---|---|---|
| 2018/0034432 A1 | 2/2018 | Shringarpure et al. |
| 2020/0204134 A1* | 6/2020 | Ahmed .................... H03F 3/08 |

FOREIGN PATENT DOCUMENTS

| | | |
|---|---|---|
| CN | 101651497 A | 2/2010 |
| CN | 101951289 B | 6/2015 |
| CN | 105684304 A | 6/2016 |
| CN | 109510598 A | 3/2019 |
| CN | 110086545 A | 8/2019 |
| EP | 2418871 A2 | 2/2012 |
| JP | 2005020417 A | 1/2005 |
| JP | 2010166216 A | 7/2010 |
| JP | 2010199697 A | 9/2010 |
| JP | 2011029976 A | 2/2011 |
| WO | 2009012699 A1 | 1/2009 |
| WO | 2018137155 A1 | 8/2018 |

OTHER PUBLICATIONS

Office Action issued in Chinese Application No. 201911101778.0 dated Nov. 26, 2021, 16 pages (with English translation).

Office Action issued in Taiwanese Application No. 109139340 dated May 4, 2021, 8 pages (with English machine translation).

PCT International Search Report and Written Opinion issued in International Application No. PCT/CN2020/112052 dated Nov. 27, 2020, 15 pages (with English translation).

Qiu et al., "Fast Synchronization 3R Burst-Mode Receivers for Passive Optical Networks," Journal of Lightwave Technology, vol. 32, No. 4, Feb. 15, 2014, 16 pages.

Office Action in Japanese Appln. No. 2022-527050, dated Apr. 18, 2023, 8 pages (with English translation).

* cited by examiner

RECEIVER, OPTICAL LINE TERMINAL, AND PASSIVE OPTICAL NETWORK SYSTEM

CROSS-REFERENCE TO RELATED APPLICATIONS

This application is a continuation of International Application No. PCT/CN2020/112052, filed on Aug. 28, 2020, which claims priority to Chinese Patent Application No. 201911101778.0, filed on Nov. 12, 2019. The disclosures of the aforementioned applications are hereby incorporated by reference in their entireties.

TECHNICAL FIELD

This application relates to the communications field, and in particular, to a receiver, an optical line terminal, and a passive optical network system.

BACKGROUND

In a passive optical network (PON) system, an optical line terminal (OLT) establishes a communication connection to all optical network units (ONUs) in a network by using an optical splitter. During uplink transmission, the ONU communicates with the OLT in a time division multiplexing manner, and a communication signal of each ONU is referred to as a burst optical signal (referred to as an "optical signal" below). Because insertion losses of links between the OLT and the ONU are different, optical powers of burst optical signals arriving at the OLT side from different ONUs are also different. Therefore, a receiver on the OLT side should have a capability of quickly capturing burst optical signals in a particular dynamic range, converting the captured burst optical signals into voltage signals by using a photodetector, and amplifying the voltage signals to a same level.

To achieve the foregoing objectives, a currently common solution is shown in FIG. 1. A receiver on an OLT side includes a semiconductor optical amplifier (SOA) and a photodetector (PD). The SOA pre-amplifies a burst optical signal received in uplink transmission, and then sends the burst optical signal to the PD for optical-to-electrical conversion. A gain of the SOA may be adjusted by regulating a pump current or the like. The PD may be specifically an avalanche photodiode (APD). An overall dynamic range of the receiver may be improved by regulating a pump current of the SOA or a voltage of the APD. In this solution, different burst optical signals are converted into voltage signals through the PD, and the voltage signals are then amplified to a same level by a succeeding amplifying circuit. In this process, the voltage signals need to be stabilized through automatic convergence. The automatic convergence takes a long time. Therefore, a disadvantage of this solution is that fast convergence cannot be implemented, and uplink bandwidth efficiency is relatively low.

SUMMARY

Embodiments of this application provide a receiver, an optical line terminal, and a passive optical network system, to resolve an existing problem of relatively long convergence time for an uplink burst optical signal in a receiver, implement reception of an optical signal in a wide dynamic range, reduce convergence time, and improve uplink bandwidth efficiency.

According to a first aspect, an embodiment of this application provides a receiver, where the receiver includes a photodetector, a first amplifier, a second amplifier, and a controller; the photodetector is coupled to the first amplifier, the first amplifier is coupled to the second amplifier, and the first amplifier and the second amplifier are separately coupled to the controller; the controller is configured to control a gain of the first amplifier and a gain of the second amplifier based on a preset arrival time of an optical signal and a gain intensity corresponding to the optical signal; the photodetector is configured to receive the optical signal and convert the optical signal into a current signal; the first amplifier is configured to convert the current signal into a first voltage signal based on the gain of the first amplifier; and the second amplifier is configured to convert the first voltage signal into a second voltage signal based on the gain of the second amplifier. When different optical signals arrive at the receiver, the controller may control and adjust a gain of the first amplifier and a gain of the second amplifier to corresponding gain values based on each optical signal, to implement reception of an optical signal in a wide dynamic range. When the first amplifier and the second amplifier use different gain value combinations for different optical signals, each output second voltage signal may be close to a required stable value, to reduce convergence time required for stabilizing a voltage signal, and improve uplink bandwidth efficiency.

In a possible design, the controller is specifically configured to: search for a gain intensity corresponding to the optical signal based on a preset global gain control (GGC) control table; generate a target reset signal combination based on the gain intensity corresponding to the optical signal, where the target reset signal combination includes at least one reset signal; generate the first control signal and the second control signal based on the target reset signal combination; and control the gain of the first amplifier by using the first control signal, and control the gain of the second amplifier by using the second control signal.

In a possible design, the first amplifier includes a trans-impedance amplifier.

In a possible design, the second amplifier includes a differential amplifier.

In a possible design, the photodetector is an avalanche photodiode (APD) and the APD is coupled to the controller. The controller is further specifically configured to: generate a third control signal based on the target reset signal combination, and control a gain of the APD by using the third control signal.

In a possible design, the receiver provided in this embodiment of this application further includes a semiconductor optical amplifier (SOA), the photodetector is a p-i-n (PIN) photoelectric detector, and the SOA is coupled to the PIN photoelectric detector and the controller. The SOA is configured to amplify the optical signal received by the PIN photoelectric detector before the PIN photoelectric detector receives the optical signal. The controller is further specifically configured to: generate a fourth control signal based on the target reset signal combination, and control a gain of the SOA by using the fourth control signal.

In a possible design, the receiver provided in this embodiment of this application further includes a buffer, where the buffer is coupled to the second amplifier, and is configured to output the second voltage signal converted by the second amplifier.

In a possible design, the receiver provided in this embodiment of this application further includes a first trans-impedance and a second trans-impedance, where the first trans-impedance is coupled to the first amplifier, the second trans-impedance is coupled to the second amplifier, and an impedance value of the first trans-impedance and an impedance value of the second trans-impedance are controllable; and the first control signal and the second control signal are respectively applied to the first trans-impedance and the second trans-impedance, to control the gain of the first amplifier and the gain of the second amplifier.

According to a second aspect, an embodiment of this application provides an OLT, where the OLT includes the receiver according to any one of the possible designs of the first aspect.

According to a third aspect, an embodiment of this application provides a PON system, where the PON system includes an OLT and the OLT includes the receiver according to any one of the possible designs of the first aspect. The passive optical network system further includes an ONU and an optical distribution network (ODN).

In the technical solutions for the receiver provided in the embodiments of this application, the receiver includes the photodetector, the first amplifier, the second amplifier, and the controller, where the photodetector is coupled to the first amplifier, the first amplifier is coupled to the second amplifier, and the first amplifier and the second amplifier are separately coupled to the controller; the controller is configured to control the gain of the first amplifier and the gain of the second amplifier based on the preset arrival time of the optical signal and the gain intensity corresponding to the optical signal; the photodetector is configured to receive the optical signal and convert the optical signal into the current signal; the first amplifier is configured to convert the current signal into the first voltage signal; and the second amplifier is configured to convert the first voltage signal into the second voltage signal. When different optical signals arrive at the receiver, the controller may control and adjust the gain of the first amplifier and the gain of the second amplifier to the corresponding gain values based on each optical signal, to implement reception of the optical signal in the wide dynamic range, reduce the convergence time required for receiving the optical signal, and improve the uplink bandwidth efficiency.

DESCRIPTION OF EMBODIMENTS

The following describes technical solutions in embodiments of this application with reference to the accompanying drawings in the embodiments of this application. It is clear that the described embodiments are merely some but not all of the embodiments of this application. All other embodiments obtained by a person skilled in the art based on the embodiments of this application without creative efforts shall fall within the protection scope of this application.

Figure 1:
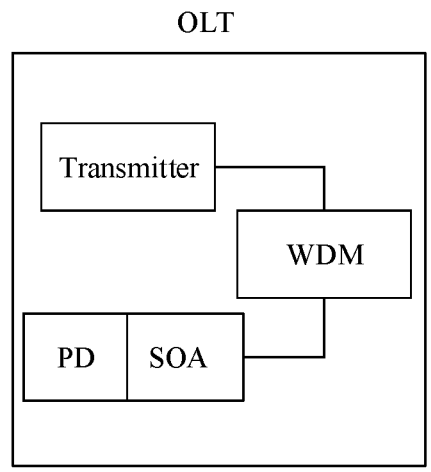
FIG. 1 is a schematic diagram of a structure of an OLT receiver in the conventional technology.
Figure 2:
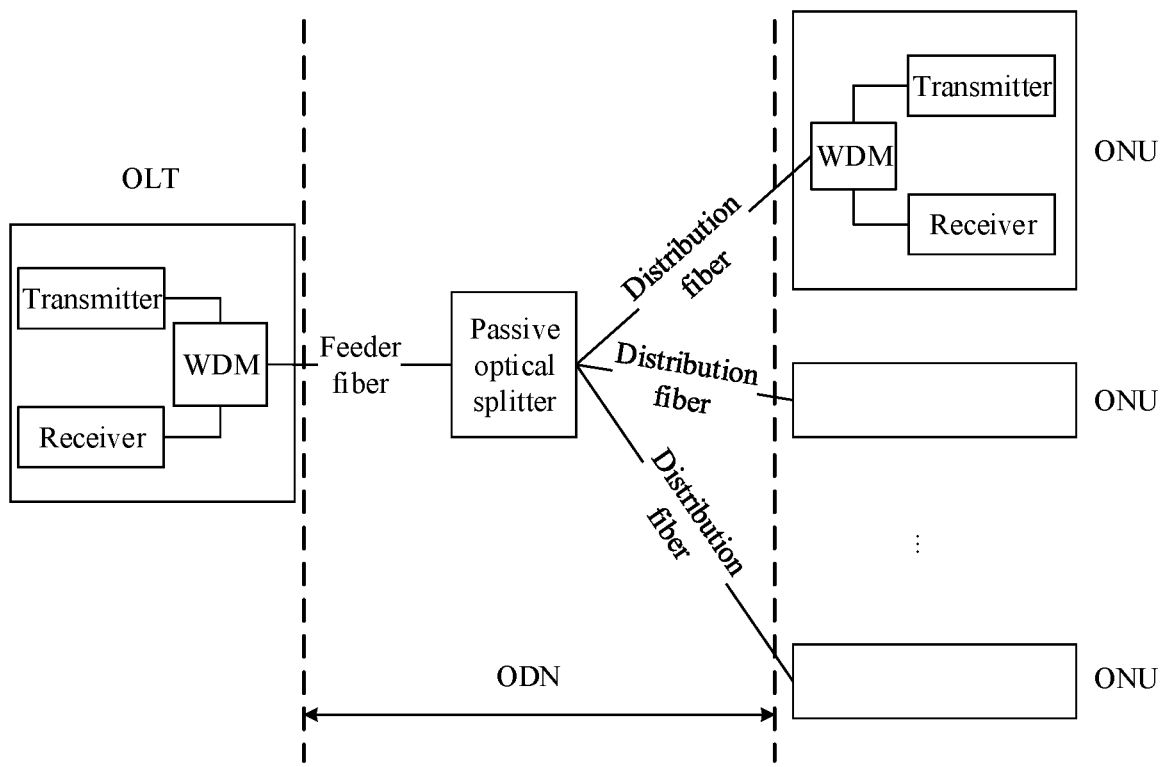
FIG. 2 is a schematic diagram of an application scenario according to an embodiment of this application.

The embodiments of this application may be applied to a passive optical network (PON) system shown in FIG. 2. The PON system includes an optical line terminal (OLT), an optical distribution network (ODN), and an optical network unit (ONU). In the PON system, transmission in a direction from the OLT to the ONU is referred to as downlink transmission, and transmission in a direction from the ONU to the OLT is referred to as uplink transmission. In the downlink transmission, the OLT broadcasts downlink data to each ONU. In the uplink transmission, time division multiplexing is used, and each ONU transmits uplink data to the OLT based on a transmission timeslot allocated by the OLT. Both the uplink data and the downlink data use an optical signal as a data carrier. The ONU provides a user side interface for the PON system, and is connected to the ODN. The ODN is a passive optical splitting device, and generally includes a passive optical splitter (which is also referred to as a splitter), a feeder fiber, and a distribution fiber. The ODN may summarize uplink data of a plurality of ONUs and transmit the uplink data to the OLT, and can also transmit downlink data of the OLT to each ONU.

An embodiment of this application provides a receiver, where the receiver may be applied to an OLT in a PON system. The receiver features a wide dynamic range and short convergence time, to implement reception of an optical signal in the wide dynamic range, and reduce convergence time required in a process of converting the optical signal into a voltage signal.

Figure 3:
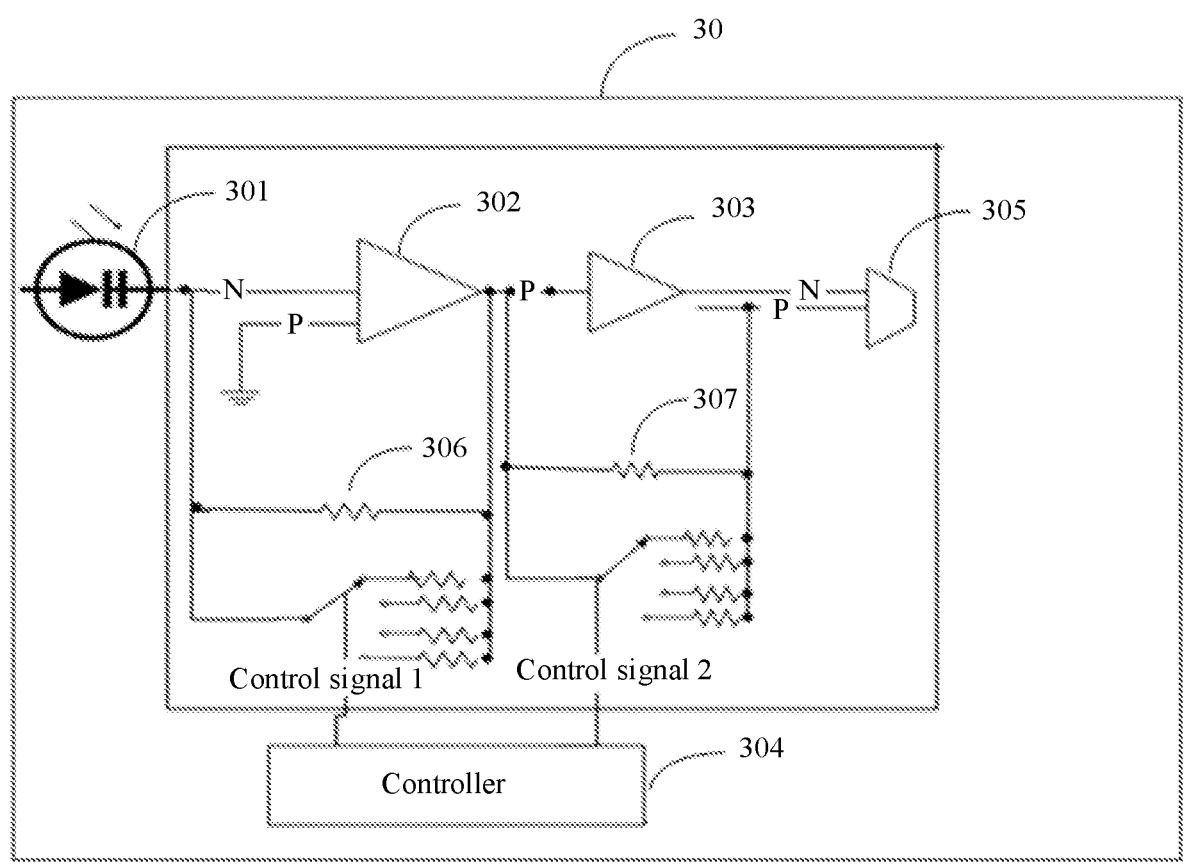
FIG. 3 is a schematic diagram of an embodiment of a receiver according to an embodiment of this application.

FIG. 3 is a schematic diagram of an embodiment of a receiver according to an embodiment of this application.

As shown in FIG. 3, the receiver 30 provided in this embodiment of this application may include a photodetector 301, a first amplifier 302, a second amplifier 303, and a controller 304, where the photodetector 301 is coupled to the first amplifier 302, the first amplifier 302 is coupled to the second amplifier 303, and the first amplifier 302 and the second amplifier 303 are separately coupled to the controller 304.

The controller 304 is configured to: generate a first control signal and a second control signal based on a preset arrival time of an optical signal and a gain intensity corresponding to the optical signal; and control a gain of the first amplifier 302 by using the first control signal, and control a gain of the second amplifier 303 by using the second control signal.

The photodetector 301 is configured to receive an optical signal and convert the optical signal into a current signal.

The first amplifier 302 is configured to convert, based on the gain of the first amplifier controlled by the controller 304, the current signal output by the photodetector 301 into a first voltage signal. The first voltage signal is a direct current voltage signal and the direct current voltage signal is unstable.

The second amplifier 303 is configured to convert, based on the gain of the second amplifier controlled by the controller 304, the first voltage signal output by the first amplifier 302 into a second voltage signal. The second voltage signal is a stable differential alternating current voltage that is output after gain amplification of the first voltage signal.

Optionally, the receiver 30 may further include a buffer 305, where the buffer 305 is coupled to the second amplifier 303, and may be configured to output the second voltage signal converted by the second amplifier 303.

When different optical signals arrive at the receiver, the controller may control and adjust a gain of the first amplifier and a gain of the second amplifier to corresponding gain values based on each optical signal, to implement reception of an optical signal in a wide dynamic range. When the first amplifier and the second amplifier use different gain value combinations for different optical signals, each output second voltage signal may be close to a required stable value, to reduce convergence time required for stabilizing a voltage signal, and improve uplink bandwidth efficiency.

Optionally, in a specific embodiment, the first amplifier 302 is specifically a trans-impedance amplifier, and the second amplifier 303 is specifically a differential amplifier.

Optionally, in a specific embodiment, the first amplifier 302 and the second amplifier 303 may be integrated on a same target chip. The target chip includes a reset pin, and the controller 304 is specifically configured to:

search for a gain intensity corresponding to the optical signal based on a preset global gain control (GGC) control table; and generate a target reset signal combination based on the gain intensity corresponding to the optical signal, where the target reset signal combination may include at least one reset signal. When the target reset signal combination includes at least one reset signal, the target reset signal combination may be any combination form of high and low level signals, or may be any combination form of wide-different pulse signals, and different combination modes may indicate different information. When the target reset signal combination includes only one reset signal, the reset signal may be a pulse signal, and pulse signals of different widths may indicate different information. The target reset signal combination is input into the reset pin, so that the target chip generates a first control signal and a second control signal. Then, the target chip may control the gain of the first amplifier 302 by using the first control signal, and control the gain of the second amplifier 303 by using the second control signal.

The GGC control table is preset based on an average uplink receive power when optical signals transmitted by different ONUs arrive at the same receiver.

Specifically, the average uplink receive power when the optical signals transmitted by the different ONUs arrive at the receiver can be calculated based on an average downlink receive power and an average uplink transmit power of the different ONUs for the optical signals, and an average downlink transmit power of the receiver itself for the optical signals. A specific calculation formula is as follows:

Purx=Putx−(Pdtx−Pdrx), where

Purx represents an uplink receive power; Pdtx represents a downlink transmit power; Putx represents an uplink transmit power; and Pdrx represents a downlink receive power. An average uplink receive power may be obtained through a plurality of calculations of optical signals.

A gain setting solution used for the optical signal transmitted by each ONU may be determined based on a receive power range in which an average uplink receive power corresponding to each ONU is located. For different receive power ranges, different gain setting solutions may be set, and gain intensities corresponding to the gain setting solutions are different, specifically as shown in Table 1.

TABLE 1

| Gain intensity | Receive power range (μA) | Control signal 1 | Control signal 2 | Control signal N | Total gain |
|---|---|---|---|---|---|
| 1 | 3 30 | 0 | 0 | ... | 83 |
| 2 | 30 100 | 0 | 1 | ... | 70 |
| 3 | 100 400 | 1 | 0 | ... | 60 |
| 4 | 400 3000 | 1 | 1 | ... | 43 |

In Table 1, a receive power of the optical signal may be represented by a current value of the current signal converted by the photodetector. For an optical signal transmitted by the ONU in a range of a lower receive power, a total gain of the optical signal received by the receiver is larger. For an optical signal transmitted by the ONU in a range of a higher receive power, a total gain of the optical signal received by the receiver is smaller.

By inputting a target reset signal combination into the reset pin on the target chip, the controller can transmit different control signals to the first amplifier and the second amplifier. When the receiver receives two optical signals adjacent to each other on the time axis, there is a timeslot in which the receiver does not receive an optical signal. When different target reset signal combinations are input through the reset pin at a start moment and an end moment of the timeslot, different gain intensities may be set. A specific solution for the target reset signal combination may be shown in the following tables.

TABLE 2

| Tail reset signal | Head reset signal | Gain intensity |
|---|---|---|
| Low level (such as 1.8 V) | Low level | 1 |
| Low level (such as 1.8 V) | High level (such as 3.3 V) | 2 |
| High level (such as 3.3 V) | Low level | 3 |
| High level (such as 3.3 V) | High level | 4 |

TABLE 3

| Tail reset signal | Head reset signal | Gain intensity |
|---|---|---|
| Narrow pulse (such as 12.8 ns) | Narrow pulse | 1 |
| Narrow pulse (such as 12.8 ns) | Wide pulse (such as 25.6 ns) | 2 |
| Wide pulse (such as 25.6 ns) | Narrow pulse | 3 |
| Wide pulse (such as 25.6 ns) | Wide pulse | 4 |

TABLE 4

| Tail reset signal | Head reset signal | Gain intensity |
|---|---|---|
| Narrow pulse (such as 12.8 ns) | Low level (such as 1.8 V) | 1 |
| Narrow pulse (such as 12.8 ns) | High level (such as 3.3 V) | 2 |
| Wide pulse (such as 25.6 ns) | Low level | 3 |
| Wide pulse (such as 25.6 ns) | High level | 4 |

TABLE 5

| Head reset signal | Gain intensity |
|---|---|
| Narrow pulse (such as 6.4 ns) | 1 |
| Narrow pulse (such as 12.8 ns) | 2 |

TABLE 5-continued

| Head reset signal | Gain intensity |
| --- | --- |
| Wide pulse (such as 19.2 ns) | 3 |
| Wide pulse (such as 25.6 ns) | 4 |

The three solutions shown in Table 2, Table 3, and Table 4 may be applied to a receiver with a single reception rate. A target reset signal combination formed by a tail reset signal and a head reset signal may enable a target integrating the first amplifier 302 and the second amplifier 303 to generate a corresponding first control signal and a corresponding second control signal, which respectively indicate the first amplifier 302 and the second amplifier 303 to use corresponding gain intensities.

The solution shown in Table 5 may also be applied to a receiver with a single reception rate. The target reset signal combination includes only the head reset signal and the reset signal is a pulse signal. Pulse signals of different widths may enable the target integrating the first amplifier 302 and the second amplifier 303 to generate a corresponding first control signal and a corresponding second control signal, which respectively indicate the first amplifier 302 and the second amplifier 303 to use corresponding gain intensities.

For a receiver with a plurality of reception rates, the solution shown in Table 6 may be used.

TABLE 6

| Tail reset signal | Head reset signal | Reception rate and gain intensity |
| --- | --- | --- |
| Narrow pulse (such as 6.4 ns) | Narrow pulse (such as 6.4 ns) | Rate 1, intensity 1 |
| Narrow pulse (such as 12.8 ns) | Narrow pulse (such as 12.8 ns) | Rate 2, intensity 2 |
| Wide pulse (such as 19.2 ns) | Wide pulse (such as 19.2 ns) | Rate 3, intensity 3 |
| Wide pulse (such as 25.6 ns) | Wide pulse (such as 25.6 ns) | Rate 4, intensity 4 |

In the solution shown in Table 6, the tail reset signal is used to indicate a reception rate, and the head reset signal is used to indicate a gain intensity.

It should be noted that, the tail reset signal is a reset signal that is input at a start moment of a timeslot in which the receiver does not receive an optical signal, that is, at a moment at which reception of a previous optical signal is completed; and the head reset signal is a reset signal that is input at an end moment of a timeslot in which the receiver does not receive an optical signal, that is, at a moment at which reception of a next optical signal starts.

Figure 4:
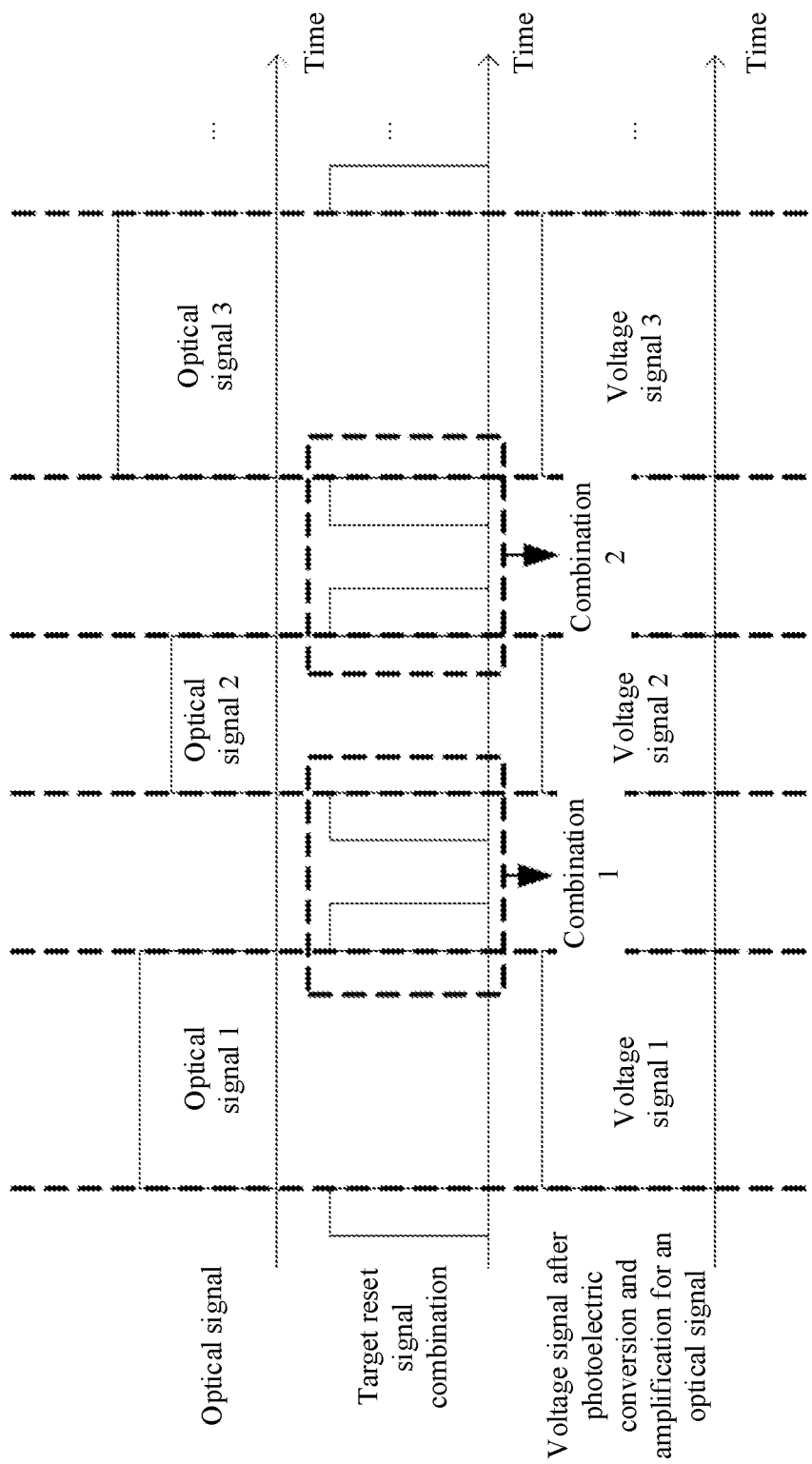
FIG. 4 is a schematic diagram of a gain adjustment process of a receiver according to an embodiment of this application.

In a simple example in which the target reset signal combination includes the tail reset signal and the head reset signal, as shown in FIG. 4, in different optical signal reception timeslots, inputting the target reset signal combination into the reset pin may control the gain of the first amplifier and the gain of the second amplifier to be adjusted, to adjust a total gain of the receiver. In this way, when receiving different optical signals, the receiver may convert the optical signals into voltage signals of a same level. It should be noted that, the voltage signals of the same level do not mean that voltage values of all the voltage signals have to be the same, but within a same deviation range.

Optionally, the receiver 30 further includes a first trans-impedance 306 and a second trans-impedance 307, where the first trans-impedance 306 is coupled to the first amplifier 302, the second trans-impedance 307 is coupled to the second amplifier 303, and an impedance value of the first trans-impedance and an impedance value of the second trans-impedance are controllable. The control signal 1 and the control signal 2 in Table 1 may be respectively used to control the first trans-impedance 306 and the second trans-impedance 307 in the receiver 30 provided in this embodiment of this application, thereby controlling the gain of the first amplifier 302 and the gain of the second amplifier 303. The control signal 1 and the control signal 2 may correspond to the first control signal and the second control signal described above.

If the receiver 30 further includes other gain components that have a gain effect, a control signal N may be further used to control gains of these gain components. It should be understood that a plurality of different total gain setting effects can be achieved by using different control signal combinations. Table 1 shows only four gain setting solutions implemented by controlling the gain of the first amplifier 302 and the gain of the second amplifier 303. When the receiver 30 further includes other gain components that have a gain effect, a quantity of the gain setting solutions may be increased.

Because different ONUs transmit optical signals based on timeslots allocated by the OLT, times at which the optical signals transmitted by the different ONUs arrive at the OLT are controlled by the OLT. Based on the gain setting solutions shown in Table 1 and the arrival times of the different optical signals controlled by the OLT, a GGC control table may be generated in advance, where corresponding gain intensities are preset for the optical signals having different arrival times.

Therefore, during operation of the receiver 30, the controller 304 may search for a gain intensity corresponding to each optical signal based on the preset GGC control table before the optical signal arrives, and generate a corresponding control signal based on the gain intensity corresponding to the optical signal, to preset a gain of each gain node (for example, the first amplifier 302 and the second amplifier 303) by using the control signal. This ensures that when the optical signal arrives, the optical signal is subject to processing such as optical-to-electrical conversion, thereby implementing fast convergence.

In a specific embodiment, the controller 304 may be a media access control (MAC) chip in the OLT, and the GGC control table may be integrated into the MAC chip.

Figure 5:
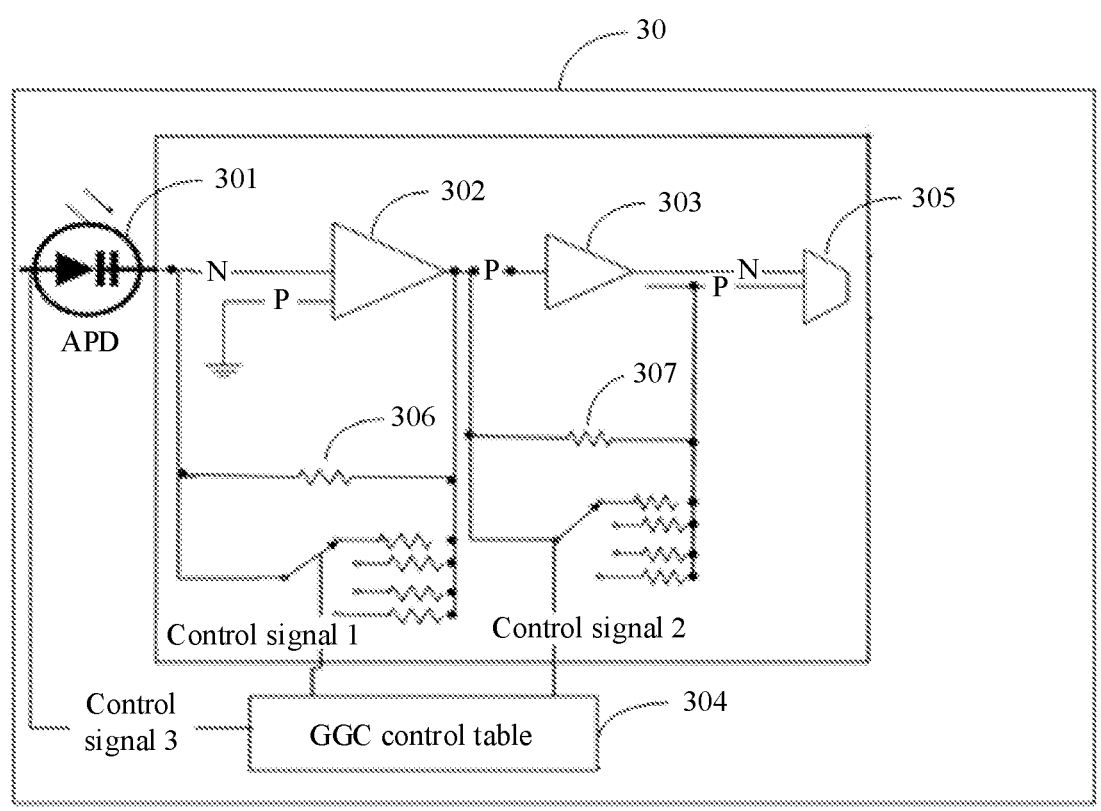
FIG. 5 is a schematic diagram of another embodiment of a receiver according to an embodiment of this application.

In a specific embodiment, as shown in FIG. 5, the photodetector 301 may be an avalanche photodiode (APD), and the APD may be coupled to the controller 304.

The controller 304 may be further specifically configured to: generate a third control signal (that is, a control signal 3 in FIG. 5) based on the gain intensity corresponding to the optical signal, and control a gain of the APD by using the third control signal. Specifically, the third control signal may control the gain of the APD by controlling a voltage of the APD. The third control signal may correspond to the control signal N in Table 1.

Figure 6:
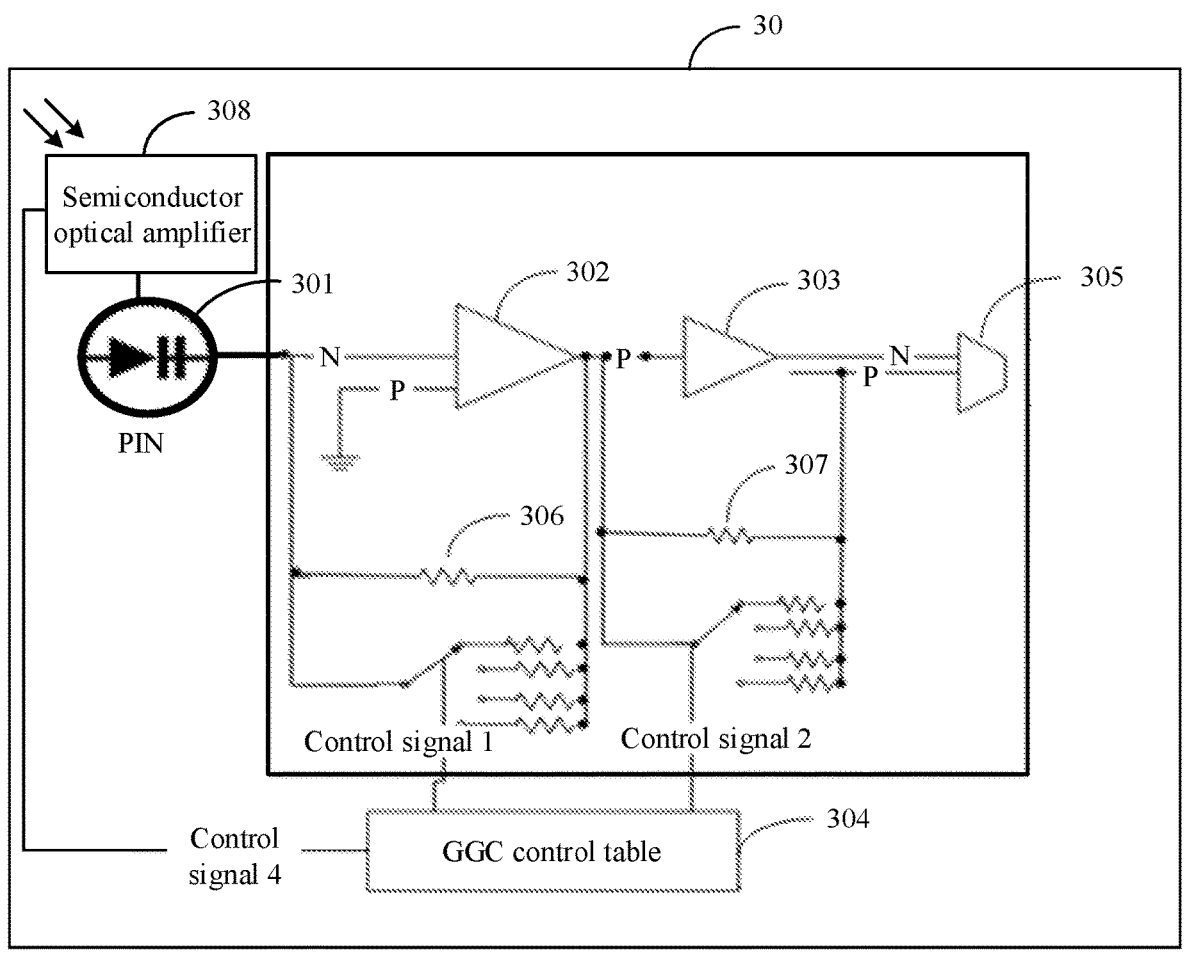
FIG. 6 is a schematic diagram of another embodiment of a receiver according to an embodiment of this application.

In a specific embodiment, as shown in FIG. 6, the receiver 30 may further include a semiconductor optical amplifier 308 (SOA). The photodetector 301 may be specifically a PIN photoelectric detector, and the SOA is coupled to the PIN photoelectric detector and the controller 304. The SOA may be configured to amplify the optical signal received by the PIN photoelectric detector before the PIN photoelectric detector receives the optical signal.

The controller 304 may be further specifically configured to: generate a fourth control signal (that is, a control signal 4 in FIG. 6) based on the gain intensity corresponding to the optical signal, and control a gain of the SOA by using the fourth control signal. Specifically, the fourth control signal may control the gain of the SOA by controlling a pump current of the SOA. The fourth control signal may correspond to the control signal N in Table 1.

An embodiment of this application provides an OLT, where the OLT includes the receiver according to any one of the foregoing embodiments.

An embodiment of this application provides a PON system, where the PON system includes an OLT and an ONU, and the OLT includes the receiver according to any one of the foregoing embodiments.

In this specification, specific examples are used to describe the principle and implementations of this application, and the description of the embodiments is only intended to help understand the method and the core idea of this application. In addition, a person of ordinary skill in the art may make modifications with respect to the specific implementations and the application scope based on the idea of this application. Therefore, the content of this specification shall not be construed as a limitation to this application.

What is claimed is:

1. A receiver, comprising a photodetector, a first amplifier, a second amplifier, and a controller, wherein the photodetector is coupled to the first amplifier, the first amplifier is coupled to the second amplifier, and the first amplifier and the second amplifier are separately coupled to the controller, and wherein:
   the controller is configured to control a gain of the first amplifier and a gain of the second amplifier based on a preset arrival time of an optical signal and a gain intensity corresponding to the optical signal;
   the photodetector is configured to receive the optical signal and convert the optical signal into a current signal;
   the first amplifier is configured to convert the current signal into a first voltage signal based on the gain of the first amplifier; and
   the second amplifier is configured to convert the first voltage signal into a second voltage signal based on the gain of the second amplifier.

2. The receiver according to claim 1, wherein the first amplifier and the second amplifier are integrated into a target chip, and the target chip comprises a reset pin; and wherein:
   the controller is configured to:
      search for a gain intensity corresponding to the optical signal based on a preset global gain control (GGC) control table;
      generate a target reset signal combination based on the gain intensity corresponding to the optical signal, wherein the target reset signal combination comprises at least one reset signal;
      input the target reset signal combination into the reset pin, wherein the target chip generates a first control signal and a second control signal; and
      control the gain of the first amplifier by using the first control signal, and control the gain of the second amplifier by using the second control signal.

3. The receiver according to claim 1, wherein the first amplifier comprises a trans-impedance amplifier.

4. The receiver according to claim 1, wherein the second amplifier comprises a differential amplifier.

5. The receiver according to claim 2, wherein the photodetector is an avalanche photodiode (APD), and the APD is coupled to the controller; and wherein:
   the controller is further configured to:
      generate a third control signal based on the gain intensity corresponding to the optical signal; and
      control a gain of the APD by using the third control signal.

6. The receiver according to claim 4, wherein the receiver further comprises a semiconductor optical amplifier (SOA), the photodetector is a p-i-n (PIN) photoelectric detector, and the SOA is coupled to the PIN photoelectric detector and the controller; and wherein:
   the SOA is configured to amplify the optical signal before the PIN photoelectric detector receives the optical signal; and
   the controller is further configured to:
      generate a fourth control signal based on the gain intensity corresponding to the optical signal; and
      control a gain of the SOA by using the fourth control signal.

7. The receiver according to claim 1, wherein the receiver further comprises a buffer, wherein the buffer is coupled to the second amplifier; and
   the buffer is configured to output the second voltage signal converted by the second amplifier.

8. The receiver according to claim 2, wherein the receiver further comprises a first trans-impedance and a second trans-impedance, the first trans-impedance is coupled to the first amplifier, the second trans-impedance is coupled to the second amplifier, and an impedance value of the first trans-impedance and an impedance value of the second trans-impedance are controllable; and
   wherein the first control signal and the second control signal are respectively applied to the first trans-impedance and the second trans-impedance to control the gain of the first amplifier and the gain of the second amplifier.

9. An optical line terminal, comprising a receiver, wherein the receiver comprises a photodetector, a first amplifier, a second amplifier, and a controller, wherein the photodetector is coupled to the first amplifier, the first amplifier is coupled to the second amplifier, and the first amplifier and the second amplifier are separately coupled to the controller, and wherein:
   the controller is configured to control a gain of the first amplifier and a gain of the second amplifier based on a preset arrival time of an optical signal and a gain intensity corresponding to the optical signal;
   the photodetector is configured to receive the optical signal and convert the optical signal into a current signal;
   the first amplifier is configured to convert the current signal into a first voltage signal based on the gain of the first amplifier; and
   the second amplifier is configured to convert the first voltage signal into a second voltage signal based on the gain of the second amplifier.

10. The optical line terminal according to claim 9, wherein the first amplifier and the second amplifier are integrated into a target chip, and the target chip comprises a reset pin; and wherein:
   the controller is configured to:
      search for a gain intensity corresponding to the optical signal based on a preset global gain control (GGC) control table;
      generate a target reset signal combination based on the gain intensity corresponding to the optical signal, wherein the target reset signal combination comprises at least one reset signal;

input the target reset signal combination into the reset pin, wherein the target chip generates a first control signal and a second control signal; and control the gain of the first amplifier by using the first control signal, and control the gain of the second amplifier by using the second control signal.

11. The optical line terminal according to claim 9, wherein the first amplifier comprises a trans-impedance amplifier.

12. The optical line terminal according to claim 9, wherein the second amplifier comprises a differential amplifier.

13. The optical line terminal according to claim 10, wherein the photodetector is an avalanche photodiode (APD), and the APD is coupled to the controller, and wherein:

the controller is further configured to:
generate a third control signal based on the gain intensity corresponding to the optical signal; and
control a gain of the APD by using the third control signal.

14. The optical line terminal according to claim 12, wherein the optical line terminal further comprises a semiconductor optical amplifier (SOA), the photodetector is a p-i-n (PIN) photoelectric detector, and the SOA is coupled to the PIN photoelectric detector and the controller, and wherein:

the SOA is configured to amplify the optical signal before the PIN photoelectric detector receives the optical signal; and the controller is further configured to:
generate a fourth control signal based on the gain intensity corresponding to the optical signal; and
control a gain of the SOA by using the fourth control signal.

15. A passive optical network system, comprising an optical line terminal, wherein the optical line terminal comprises a receiver, and wherein the receiver comprises a photodetector, a first amplifier, a second amplifier, and a controller, wherein the photodetector is coupled to the first amplifier, the first amplifier is coupled to the second amplifier, and the first amplifier and the second amplifier are separately coupled to the controller, and wherein:

the controller is configured to control a gain of the first amplifier and a gain of the second amplifier based on a preset arrival time of an optical signal and a gain intensity corresponding to the optical signal;

the photodetector is configured to receive the optical signal and convert the optical signal into a current signal;

the first amplifier is configured to convert the current signal into a first voltage signal based on the gain of the first amplifier; and the second amplifier is configured to convert the first voltage signal into a second voltage signal based on the gain of the second amplifier.

16. The passive optical network system according to claim 15, wherein the first amplifier and the second amplifier are integrated into a target chip, and the target chip comprises a reset pin; and wherein:

the controller is configured to:
search for a gain intensity corresponding to the optical signal based on a preset global gain control (GGC) control table;
generate a target reset signal combination based on the gain intensity corresponding to the optical signal, wherein the target reset signal combination comprises at least one reset signal;
input the target reset signal combination into the reset pin, wherein the target chip generates a first control signal and a second control signal; and
control the gain of the first amplifier by using the first control signal, and control the gain of the second amplifier by using the second control signal.

17. The passive optical network system according to claim 15, wherein the first amplifier comprises a trans-impedance amplifier.

18. The passive optical network system according to claim 15, wherein the second amplifier comprises a differential amplifier.

19. The passive optical network system according to claim 16, wherein the photodetector is an avalanche photodiode (APD), and the APD is coupled to the controller, and wherein:

the controller is further configured to:
generate a third control signal based on the gain intensity corresponding to the optical signal; and
control a gain of the APD by using the third control signal.

20. The passive optical network system according to claim 18, wherein the passive optical network system further comprises a semiconductor optical amplifier (SOA), the photodetector is a p-i-n (PIN) photoelectric detector, and the SOA is coupled to the PIN photoelectric detector and the controller, and wherein:

the SOA is configured to amplify the optical signal before the PIN photoelectric detector receives the optical signal; and the controller is further configured to:
generate a fourth control signal based on the gain intensity corresponding to the optical signal; and
control a gain of the SOA by using the fourth control signal.

* * * * *